A. L. STREAMBERG.
PAY ROLL COMPUTING DEVICE.
APPLICATION FILED MAR. 3, 1915.

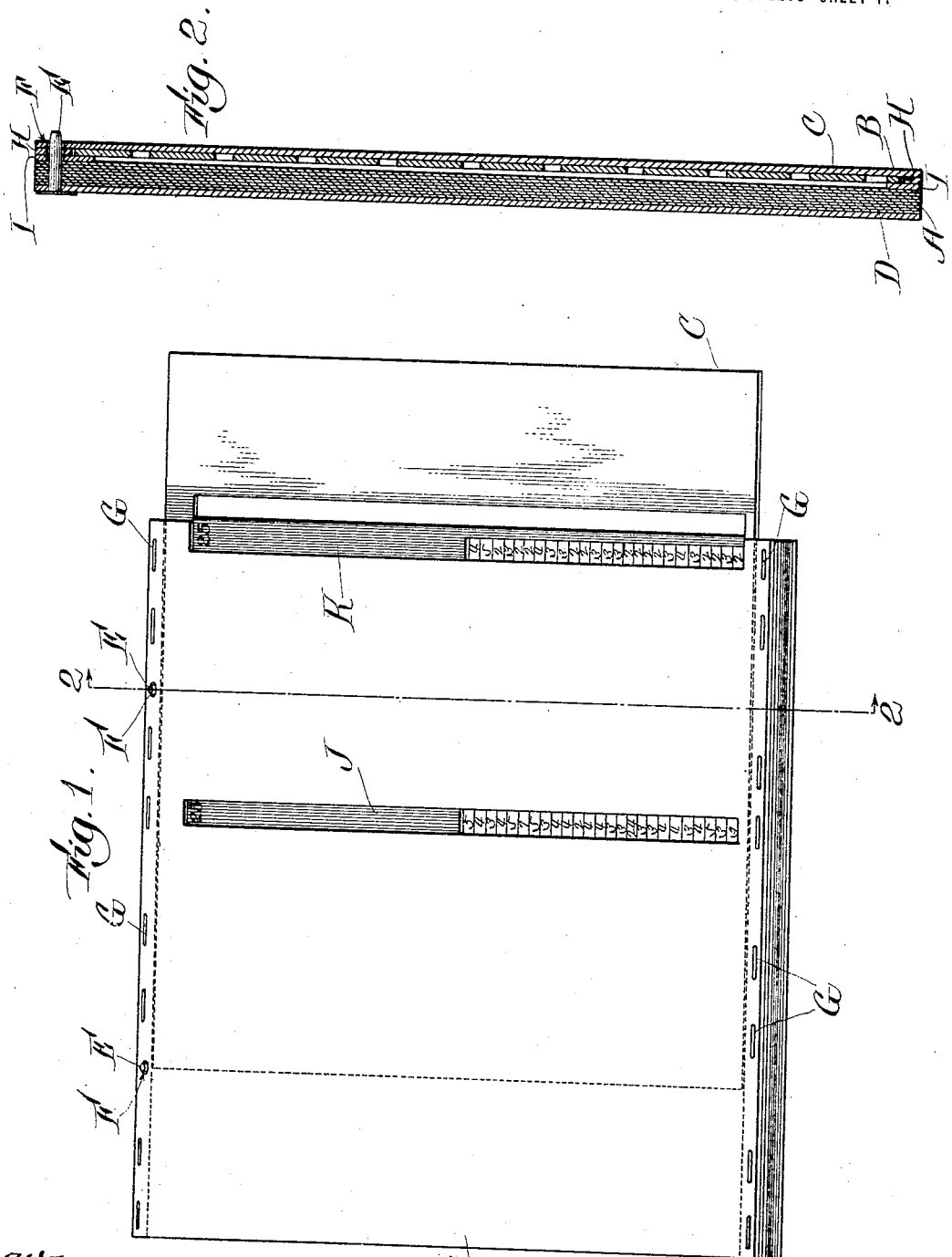

1,234,956.

Patented July 31, 1917.
3 SHEETS—SHEET 2.

Fig. 3.

Witnesses:
Geo. E. Stebbins
Bessie J. Smith

Inventor:
Arthur L. Streamberg
Phillips Van Everen & Fish
Attys

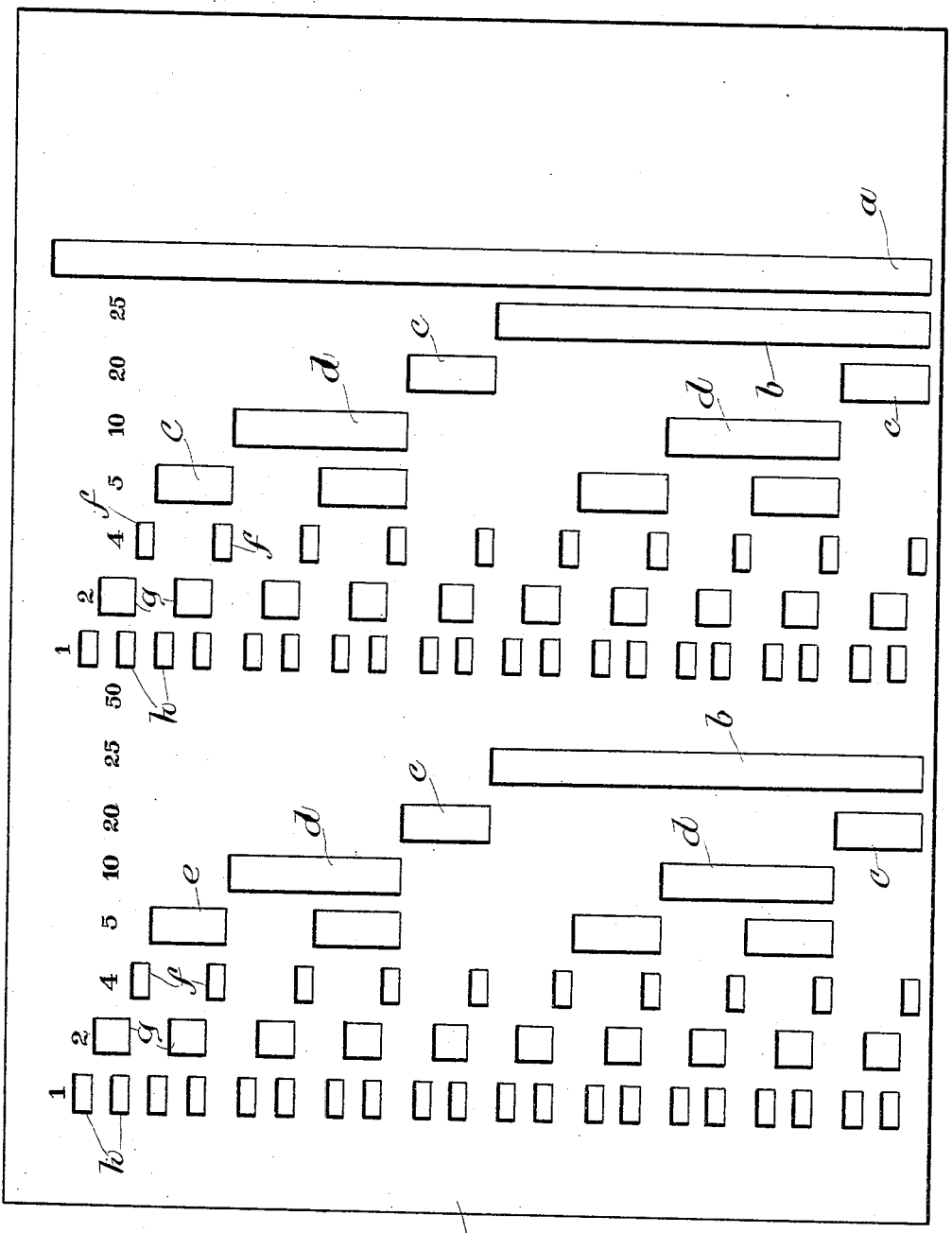

UNITED STATES PATENT OFFICE.

ARTHUR L. STREAMBERG, OF SWAMPSCOTT, MASSACHUSETTS.

PAY-ROLL-COMPUTING DEVICE.

1,234,956.      Specification of Letters Patent.      Patented July 31, 1917.

Application filed March 3, 1915. Serial No. 11,663.

*To all whom it may concern:*

Be it known that I, ARTHUR L. STREAMBERG, a citizen of the United States, residing at Swampscott, in the county of Essex and State of Massachusetts, have invented certain new and useful Improvements in Pay-Roll-Computing Devices; and I do hereby declare the following to be a full, clear, and exact description of the invention, such as will enable others skilled in the art to which it appertains to make and use the same.

The present invention relates to a payroll computing device, and more particularly to a device for finding the amount of coins of the various denominations necessary to make up the payroll.

The object of the invention is to produce a device of this character which can be manufactured and sold cheaply and by means of which the payroll can be readily and quickly computed. With this object in view, the present invention consists in the payroll computing device hereinafter described and particularly pointed out in the claims.

In the drawings which illustrate the preferred embodiment of the invention, Figure 1 is a perspective view of the device; Fig. 2 is a section taken on the line 2—2 of Fig. 1; Fig. 3 is a plan view of the tabulating sheet; and Fig. 4 is a plan view of the perforated sheet or slide.

The illustrated embodiment of the device comprises a tabulating sheet A, a second sheet or cover B, and a third sheet or perforated slide C. The tabulating sheets are bound in the form of a block D containing any convenient number of sheets. The top of the block is provided with projecting studs E. The cover B has holes F which fit over the studs E to hold the cover in a fixed relation to the block of tabulating sheets A. The cover B is provided at its top and bottom edges (Fig. 2) with slideways in which are received the top and bottom edges of the perforated slide C. These slideways are formed by securing to the back of the cover B, by means of staples G, two strips H and I, the strip H being narrower than the strip I so as to form the slideway between the back of the cover B and the projecting edge of the strip I. The cover B has two cutaway portions J and K which coincide with certain columns of the tabulating sheet hereinafter described. The perforated slide C is provided with a plurality of cutaway portions or perforations, as shown in Fig. 4. These perforations are parallel with the cutaway portions J and K and by moving the perforated slide C the perforations may be successively brought in coincidence with the cutaway portions J and K.

Referring particularly to the tabulating sheet A, as shown in Fig. 3:—The sheet is divided into a number of columns and rows by vertical and horizontal lines. Two of the columns L and M, which may be called for convenience "odd cent index columns" are printed with the figures denoting the various odd cent fractional amounts of a dollar from one to ninety-nine cents. Opposite the odd cent indices are tally rows N, each tally row having twenty blank spaces or squares, the spaces being set off into fives by the heavy lines O. These tally rows are filled in by making a small diagonal mark or tally P for each occurrence of the odd cent amount in question in the payroll book. At the ends of the tally rows are "odd cent number columns" Q and R in which are filled in the numbers of the tallies in the rows, these numbers representing the number of times that the odd cent amounts in question occur in the payroll. In using the device for computing the number of bills and coins of each denomination required for the payroll, the clerk first goes through the payroll book and picks out the number of ten dollar bills required, entering this number opposite the proper page in the ten dollar column S at the left of the tabulating sheet. In a similar way the number of five, two and one dollar bills are picked out of the payroll book and entered in the five, two and one dollar columns. The process of picking out the number of bills of the proper denomination from the payroll can be done very readily by the experienced payroll clerk.

After the bills of the proper denomination are picked out, the payroll clerk goes back through the payroll book and enters the odd cent amounts on the tabulating sheet. This is done as follows: Whenever an odd cent amount occurs in a certain man's pay, the clerk makes a tally in one of the tally rows opposite the proper odd cent index. When the clerk has gone through the payroll the tally rows will have the appearance shown in Fig. 3. For example, as shown in Fig. 3, the odd cent amount of sixteen cents occurred eight times in the payroll. If any number occurs more than twenty times, the clerk enters the tallies above twenty by a diagonal line crossing the first diagonal lines so that the squares in the tally rows having crosses represent two occurrences of the amount. Thus, as shown in Fig. 3, the tally row of the forty cent amounts shows an occurrence of forty cents twenty-four times in the payroll. After the tallies have been checked in, the clerk adds up the number of tallies, entering the sums in the odd cent number columns Q and R. The numbers thus filled in in the columns Q and R represent the total number of times the various odd cent amounts occur in the payroll.

The step just described consists in tabulating the number of occurrences of the various odd cent amounts in the payroll. The clerk, by making the tallies and adding them readily picks out, brings together and adds up the total numbers of the various odd cent amounts which occur in the pay of the various employees.

The next step consists in treating the numbers of the odd cent amounts so as to determine the correct number of coins of the various denominations to make up these odd cent amounts in the pay envelops. This is done by segregating the numbers in the columns Q and R into groups according to the coins of the same denomination which are contained in the odd cent amounts. For example, all of the numbers in the column R correspond to the numbers of occurrences in the payroll of odd cent amounts from fifty to ninety-nine cents inclusive. These odd cent amounts all contain a fifty cent coin. Therefore, the numbers in the column R constitute a group, the sum of which denotes the total number of fifty cent pieces required for the payroll. Similarly, the odd cent amounts from twenty-five to forty-nine cents inclusive and from seventy-five to ninety-nine cents inclusive all contain a twenty-five cent coin and the numbers in the columns Q and R which denote the number of occurrences in the pay-roll of such odd cent amounts form a group, the sum of which is the total number of twenty-five cent pieces necessary for the payroll. In a similar way the numbers representing the occurrence of odd cent amounts containing ten, five and one cent pieces may be grouped. In order to more easily compute the number of coins, use is made of what may be termed "fictitious coins" of twenty, four and two cent denominations. By multiplying the numebr of fictitious twenty cent coins by two, the proper number of ten cent pieces to make up the fictitious twenty cent pieces are obtained. Similarly, by multiplying the number of fictitious four cent pieces by four and two cent pieces by two, the proper number of one cent pieces to make up these fictitious coins may be computed. For example, the odd cent amounts of twenty to twenty-four cents, inclusive, forty-five to forty-nine cents inclusive, seventy to seventy-four cents inclusive, and ninety-five to ninety-nine cents inclusive, contain the fictitious twenty cent coin and the numbers in the columns Q and R which represent the number of occurrences of such odd cent amounts in the payroll, form a group, the sum of which is the total number of fictitious twenty cent coins required. By multiplying this by two is obtained the number of ten cent pieces required in the pay enevolps in making up such odd cent amounts. And similarly, with the amounts containing the fictitious four and two cent coins.

The segregation of the numbers in the odd cent number columns Q and R into such groups, is carried out by means of the cover B and the perforated slide C. The perforated slide C is moved so that the long slot $a$ coincides with the cutaway portion K of the cover. This exposes the entire column Q. The figure "50" printed on the slide C will appear at the top of the cutaway portion J to denote that the exposed group shows the total number of fifty cent pieces required. By multiplying this sum by fifty cents, the amount of money in fifty cent pieces is obtained. Next, the slide is drawn along until the two perforations $b$ coincide with the cutaway portions J and K of the cover B exposing the group of numbers representing the number of occurrences in the payroll of odd cent amounts containing a twenty-five cent coin. The printed figures "25" appear near the tops of the cutaway portions K and J and denote that these are the twenty-five cent groups. This position of the slide is shown in Fig. 1 of the drawings. By adding the numbers of these groups and multiplying by twenty-five cents, the amount of money in twenty-five cent pieces necessary for the pay envelops is obtained. Next, the slide is moved until the next set of perforations $c$ match with the cutaway portions of the cover and the printed figures "20" appear. This exposes the group of numbers which, when added, gives the number of odd cent amounts requiring the fictitious twenty cent coins in the pay envelops. By multiplying this sum by two and multiplying the product by ten cents, the amount of money in ten cent pieces necessary in the pay envelops to make up the odd cent amounts of twenty to twenty-four, forty-five to forty-nine, seventy to seventy-four and ninety-five to ninety-nine cents inclusive, in the payroll is obtained. Then, the slide C is moved along until the perforations $d$ match with the cutaway portions J and K exposing the group of numbers in the odd cent number columns which show the total number of occurrences of the odd cent amounts of ten to nineteen, thirty-five to forty-four, sixty to sixty-nine, eighty-five to ninety-four cents inclusive, all of which requires single ten cent pieces. Multiplying the sum of these numbers in the groups gives the amount of money in ten cent pieces required for such odd cent amounts. By adding this to the amount of money in ten cent pieces required for the fictitious twenty-cent pieces, the total amount of money in ten cent pieces for the payroll is obtained. Similarly the slide C is moved along step by step bringing the perforations $e$, $f$, $g$ and $h$ into coincidence with the cutaway portions J and K and the amount of money in five cent pieces and one cent pieces is computed.

Then the number of pieces of money of the various denominations, together with the amounts are entered in the "Summary" in the lower left hand corner of the tabulating sheet. The sum of the amounts is the payroll total as found by the addition of the payroll book. The tabulating sheet and payroll book each furnishes a check on the accuracy of the other. The tabulating sheets may be filed away and serve as a permanent record and check on the payroll book.

For the purpose of getting the tabulating sheet as near square as possible, the odd cent amount numbers are arranged in two columns from one to forty-nine and from fifty to ninety-nine respectively. It is, of course, obvious that by making the sheet longer and narrower, a single column might be used and the cover B and slide C modified to correspond. Therefore, the invention is not limited to the use of a tabulating sheet having any particular number of columns. Moreover, while for the sake of checking in the tallies and adding the number columns, it is more convenient to arrange the tallies in rows and the odd cent indices and numbers in columns, the tallies might be arranged in columns and the odd cent indices and numbers in rows. The terms "rows" and "columns" as used in the claims are intended as words of description and not of limitation, and the term "rows" to include arrangements in columns as well as rows, and the word "columns" to include arrangement in rows as well as columns. While the use of the cover and perforated slide is the best means known to me for grouping the numbers according to the coins of the same denomination contained in the corresponding odd cent amounts, other grouping means may be employed such, for example, as columns printed on the tabulating sheet in which may be entered the numbers falling in each group so that, by the addition of such columns, the total number of coins might be obtained.

While the preferred embodiment of the present invention has been specifically illustrated and described, it is understood that the invention is not limited to the illustrated details of construction but may be embodied in other constructions within the scope of the invention as defined in the following claims:

1. A device of the character described having, in combination, a sheet having rows headed with indices of the various odd cent amounts of a dollar for tabulating the numbers of occurrences of the various odd cent amounts in a payroll and a mechanical device for segregating the numbers according to the coins of the same denomination contained in the amounts.

2. A device of the character described having, in combination, a ruled tabulating sheet having rows headed with indices of the various odd cent fractional amounts of a dollar, each row to be filled in by tallies representing the occurrences of the respective odd cent amounts in the payroll, a column or columns in which are summed up the numbers of such tallies, a cover superposed in fixed relation to the tabulating sheet and having a cutaway portion or portions above the column or columns, and a slide having perforations which may be brought into coincidence with the cutaway portions of the second sheet to expose the groups of numbers representing the numbers of occurrences of the odd cent amounts which contain a coin of the same denomination.

3. A device of the character described having, in combination, a ruled tabulating sheet having rows headed with indices of the various odd cent fractional amounts of a dollar, each row to be filled in by tallies representing the occurrences of the respective odd cent amounts in the payroll, a column or columns in which are summed up the numbers of such tallies, a cover superposed in fixed relation to the tabulating sheet and having a cutaway portion or portions above the column or columns, and a slide having perforations which may be brought into coincidence with the cutaway portions of the cover to expose the groups of numbers representing the occurrence in the payroll of odd cents containing fifty, twenty-five, ten, five and one cent coins and the fictitious coins of twenty, four and two cents.

ARTHUR L. STREAMBERG.

Witnesses:
GRACE STREAMBERG,
GEO. E. STEBBINS.

Copies of this patent may be obtained for five cents each, by addressing the "Commissioner of Patents, Washington, D. C."